United States Patent
Prüssmeier et al.

(10) Patent No.: US 9,828,179 B2
(45) Date of Patent: Nov. 28, 2017

(54) CONVEYING DEVICE AND CARRIAGE FOR CONVEYING DEVICE

(71) Applicant: Beckhoff Automation GmbH, Verl (DE)

(72) Inventors: Uwe Prüssmeier, Lemgo (DE); Uwe Borchardt, Vlotho (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 173 days.

(21) Appl. No.: 14/811,509

(22) Filed: Jul. 28, 2015

(65) Prior Publication Data
US 2016/0031648 A1 Feb. 4, 2016

(30) Foreign Application Priority Data
Jul. 29, 2014 (DE) .......................... 10 2014 110 714

(51) Int. Cl.
*B65G 9/00* (2006.01)
*B65G 54/02* (2006.01)

(52) U.S. Cl.
CPC ............. *B65G 9/002* (2013.01); *B65G 9/008* (2013.01); *B65G 54/02* (2013.01); *B65G 2207/48* (2013.01)

(58) Field of Classification Search
CPC ........... B60L 13/03; B65G 9/00; B65G 9/002; E01B 25/00; E01B 25/08; E01B 25/22; E01B 25/24
See application file for complete search history.

(56) References Cited

U.S. PATENT DOCUMENTS

| | | | |
|---|---|---|---|
| 4,867,579 A | 9/1989 | Gallone |
| 4,884,898 A | 12/1989 | Magnuson |
| 5,086,705 A | 2/1992 | Jarvis |
| 5,211,279 A | 5/1993 | Abbestam et al. |
| 5,562,201 A † | 10/1996 | Kennedy |
| 2012/0090963 A1 † | 4/2012 | Van De Loecht |
| 2015/0027338 A1 † | 1/2015 | Aumann |

FOREIGN PATENT DOCUMENTS

| | | | |
|---|---|---|---|
| DE | 1951783 A1 | 12/1995 | |
| DE | 19519783 | * 12/1995 | ................ B66F 9/07 |
| DE | 19519783 A1 † | 12/1995 | |

(Continued)

*Primary Examiner* — R. J. McCarry, Jr.
(74) *Attorney, Agent, or Firm* — Dorsey & Whitney LLP

(57) ABSTRACT

The invention relates to a conveying device comprising at least one movable carriage on which at least one first group and at least one second group of track rollers are disposed, and a track rail disposed so as to be locationally fixed for guiding the carriage. The track rail has at least one track face, at least one straight portion and at least one curved portion. The track rollers are configured in such a manner that during movement of the carriage along the straight portion, exclusively the track rollers of the first group roll on the track face assigned to the straight portion, and during movement of the carriage along the curved portion, exclusively the track rollers of the second group roll on the track face assigned to the curved portion. The invention furthermore relates to a further conveying device and corresponding carriages, as described herein.

12 Claims, 19 Drawing Sheets

(56) References Cited

FOREIGN PATENT DOCUMENTS

| | | | |
|---|---|---|---|
| DE | 102010028055 | A1 | 10/2011 |
| DE | 102012103378 | A1 | 10/2013 |
| EP | 0577995 | A2 | 1/1994 |
| EP | 2042759 | A2 | 4/2009 |
| WO | 2011131386 | A1 † | 10/2011 |

\* cited by examiner
† cited by third party

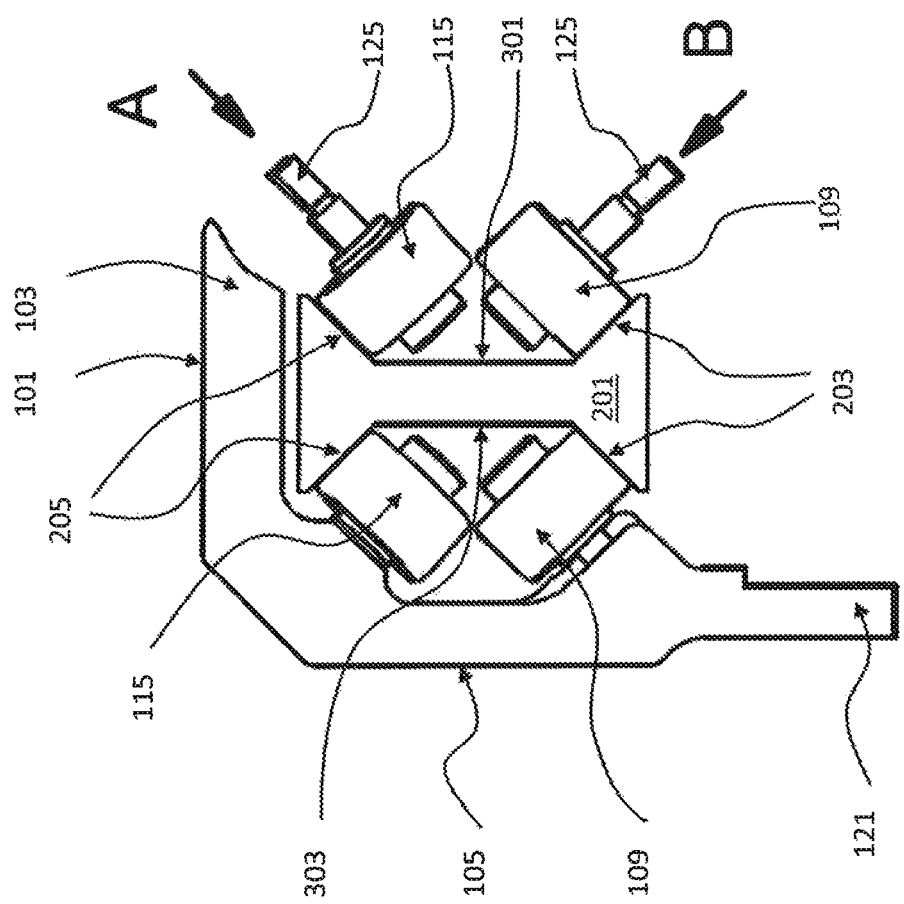

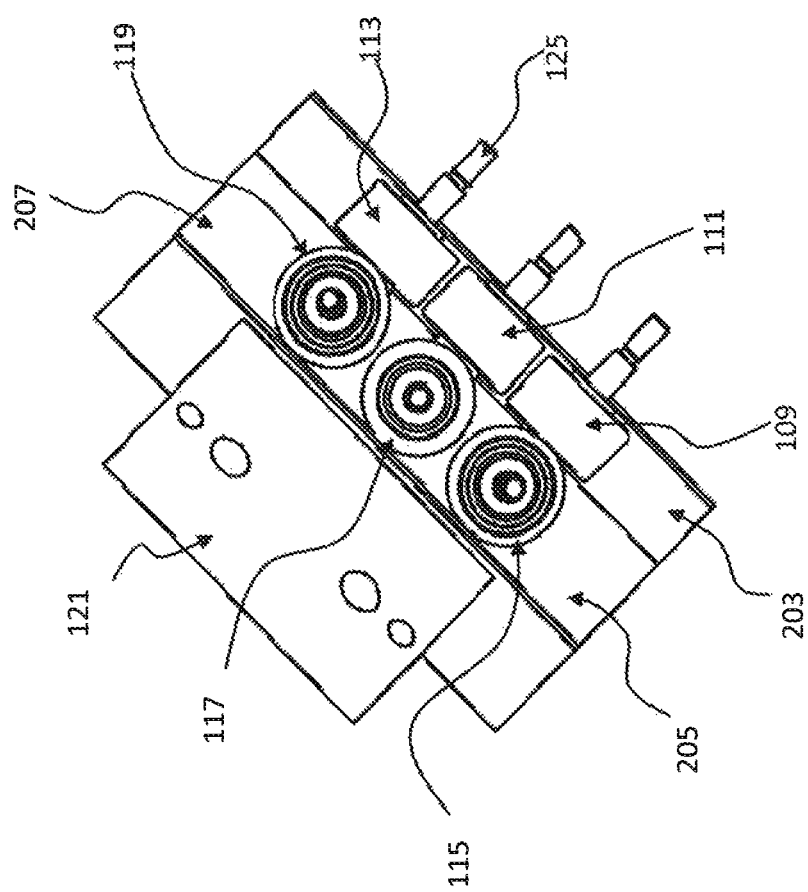

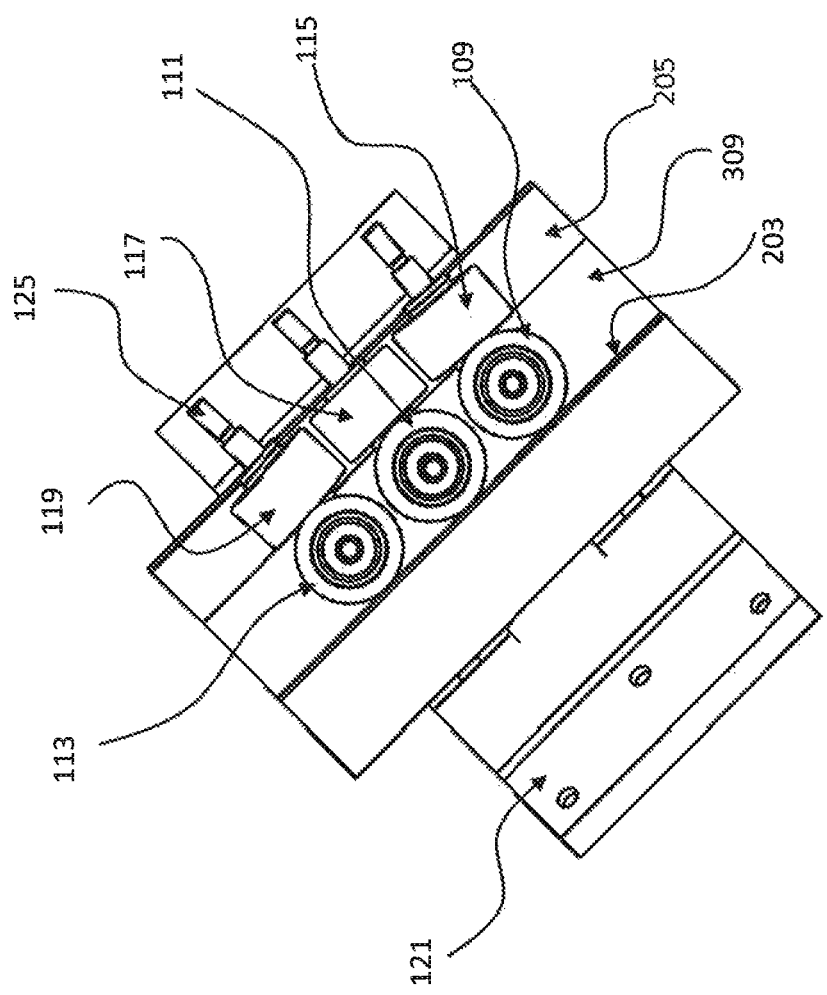

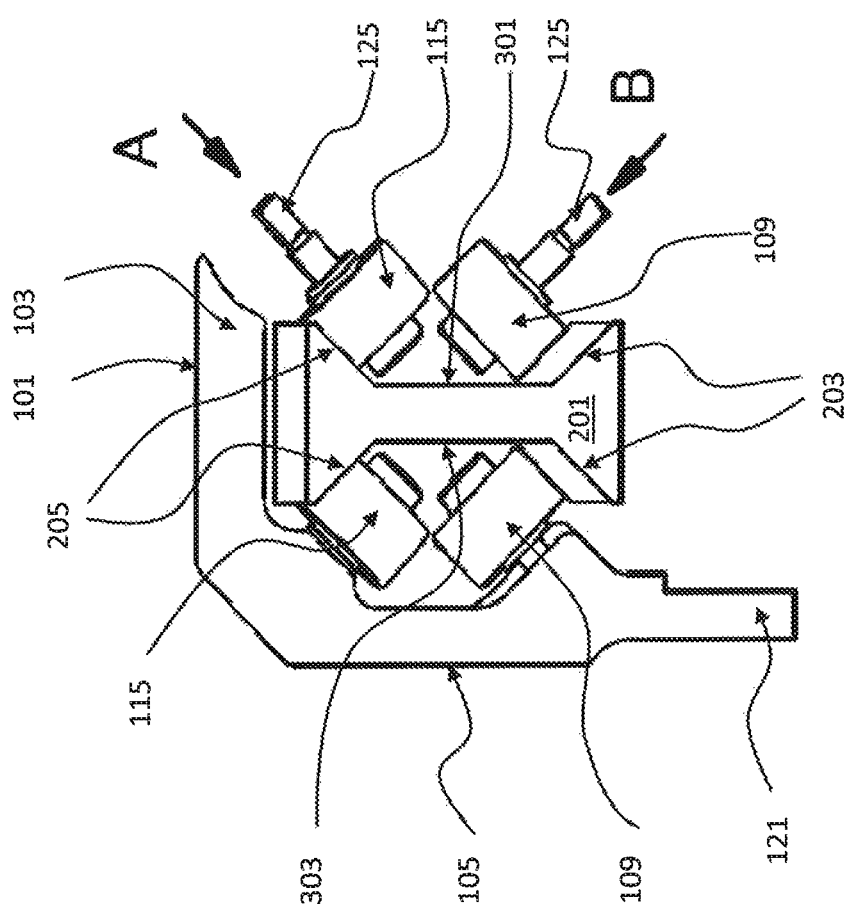

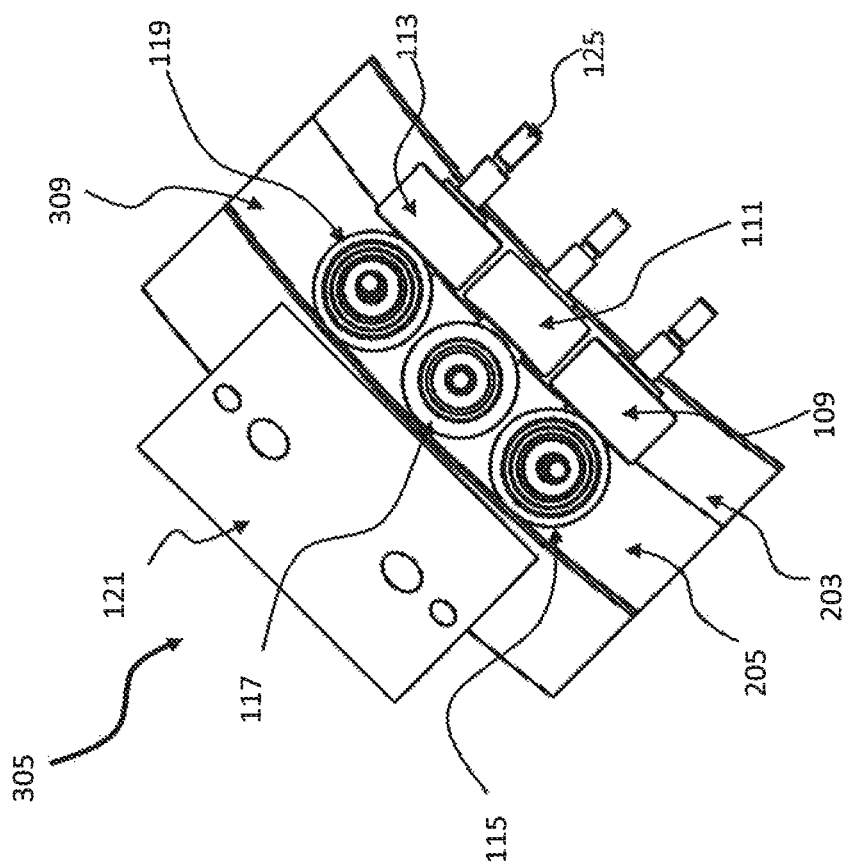

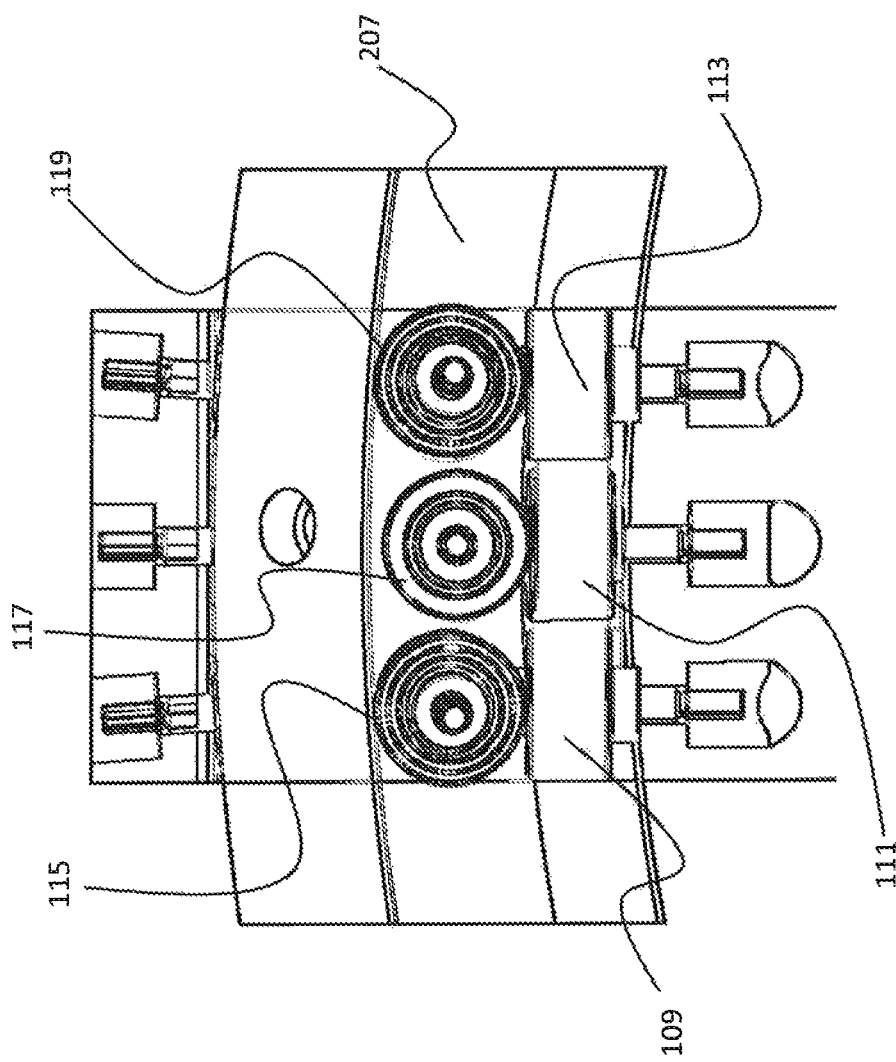

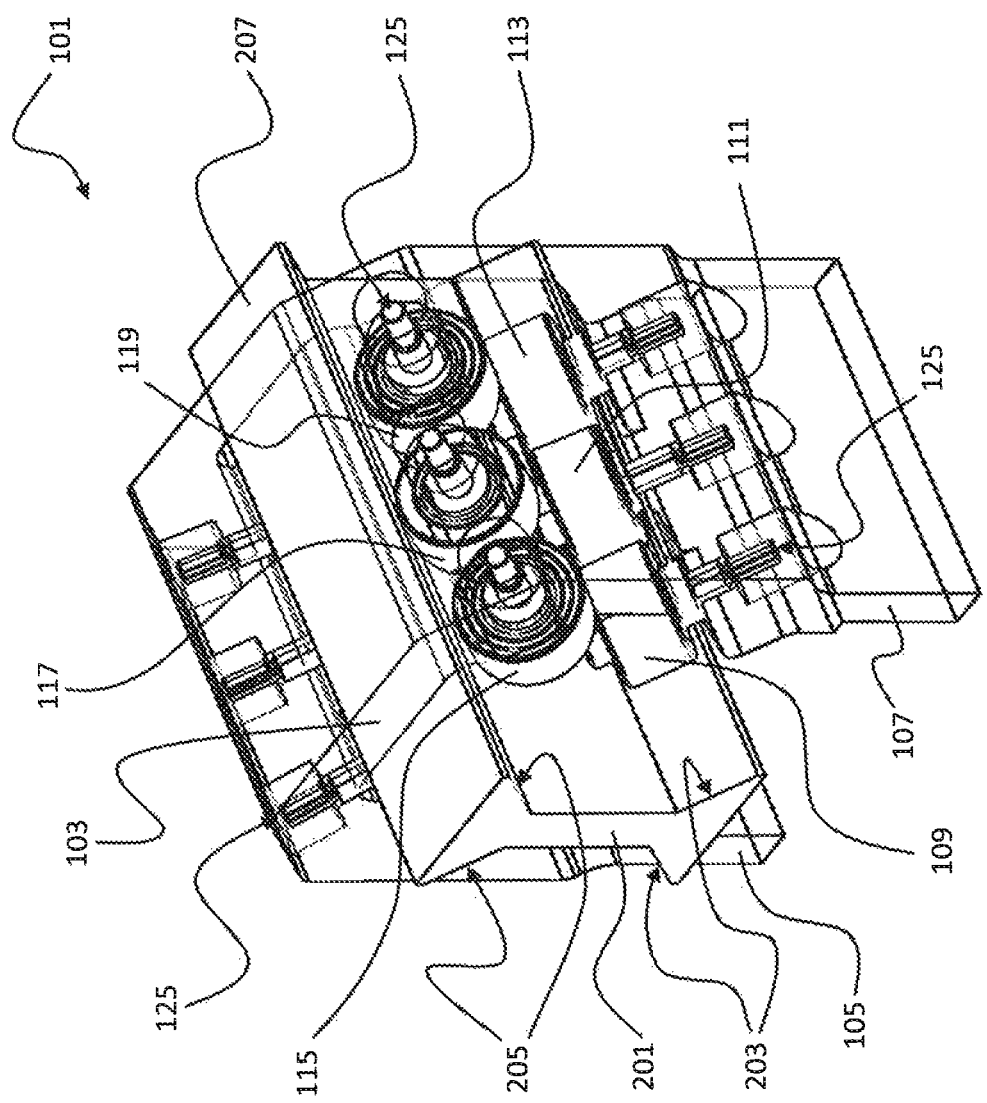

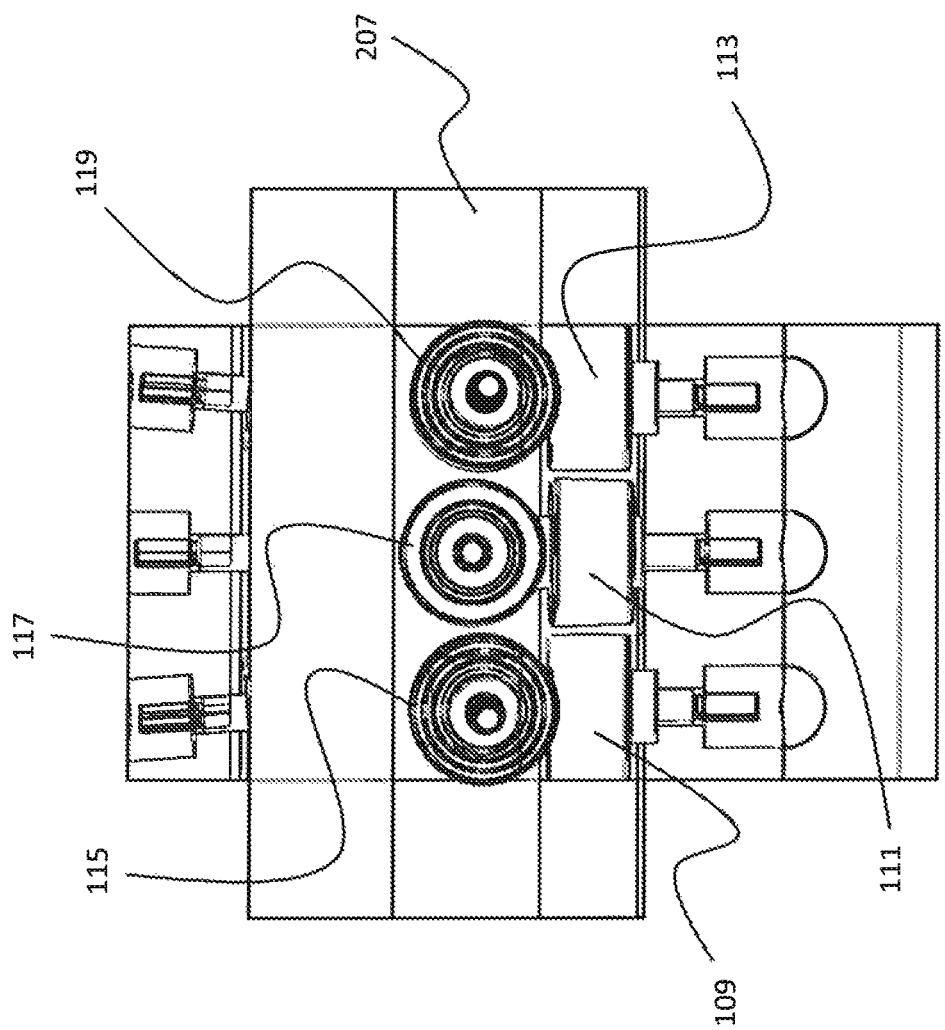

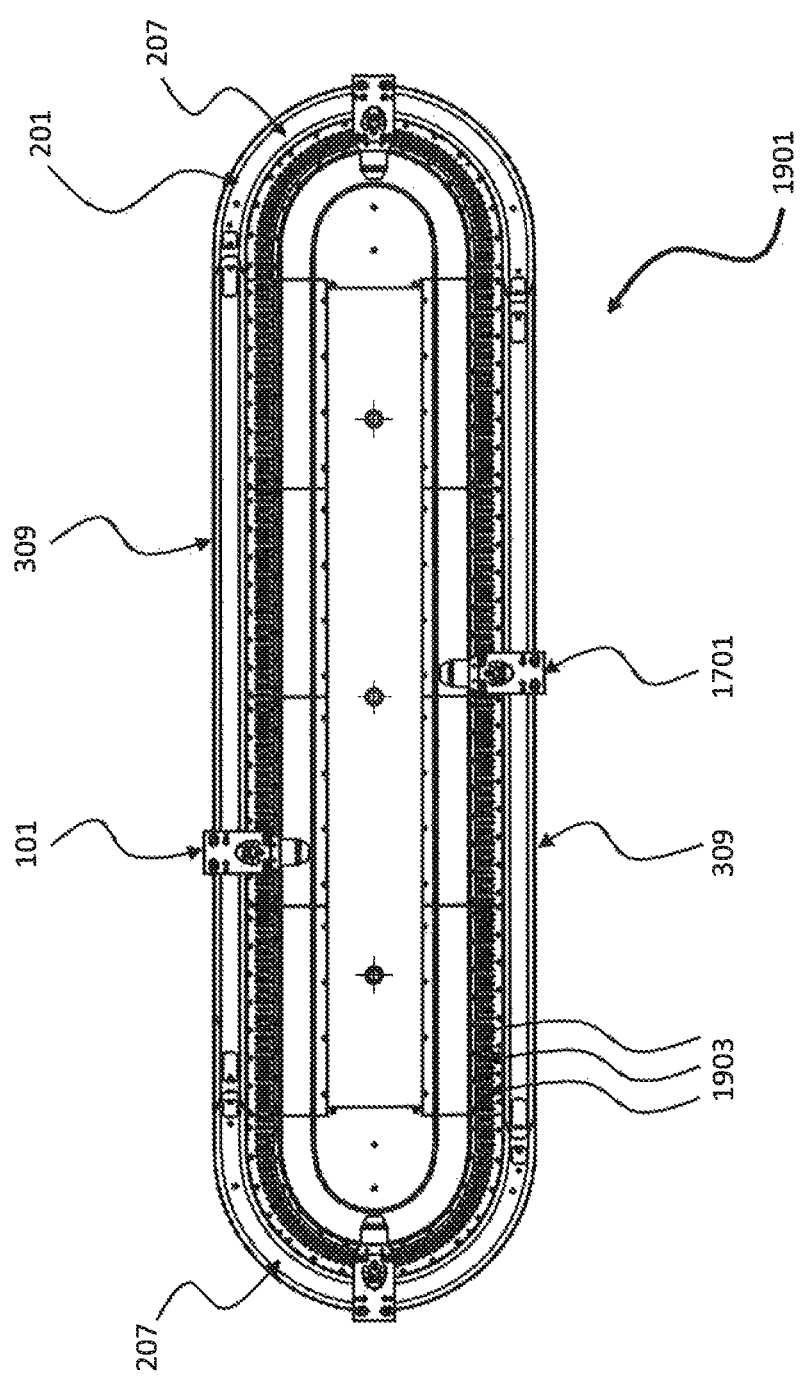

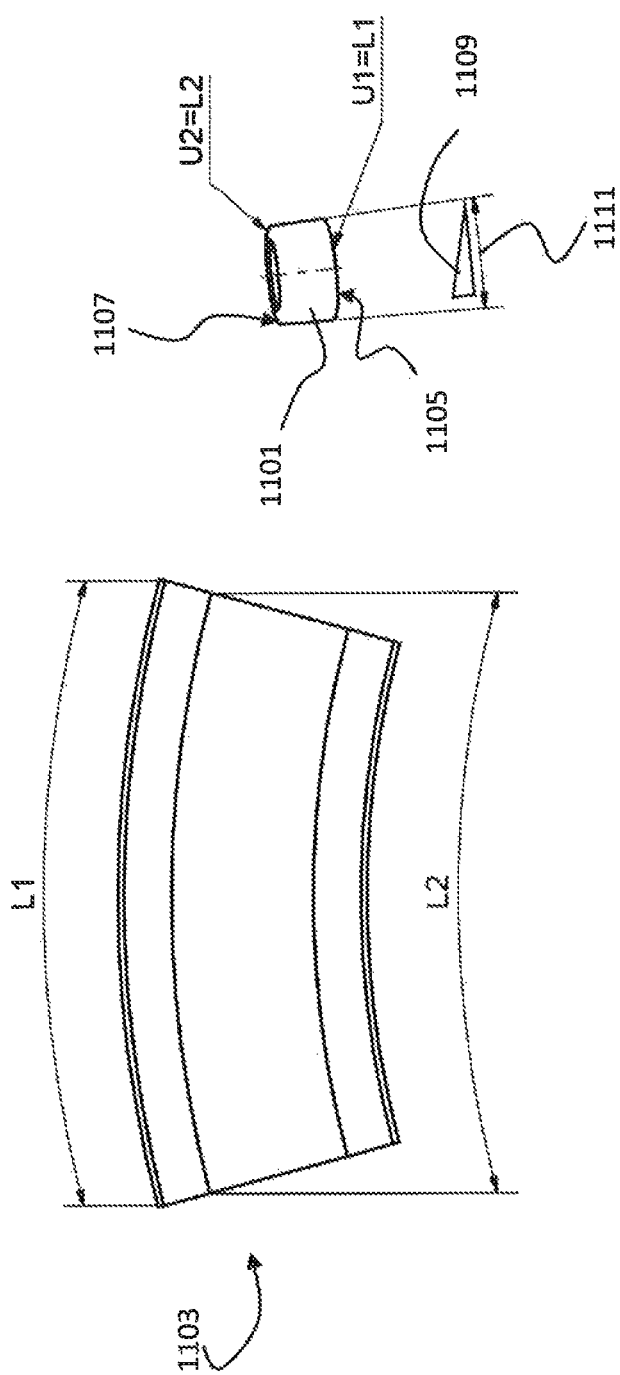

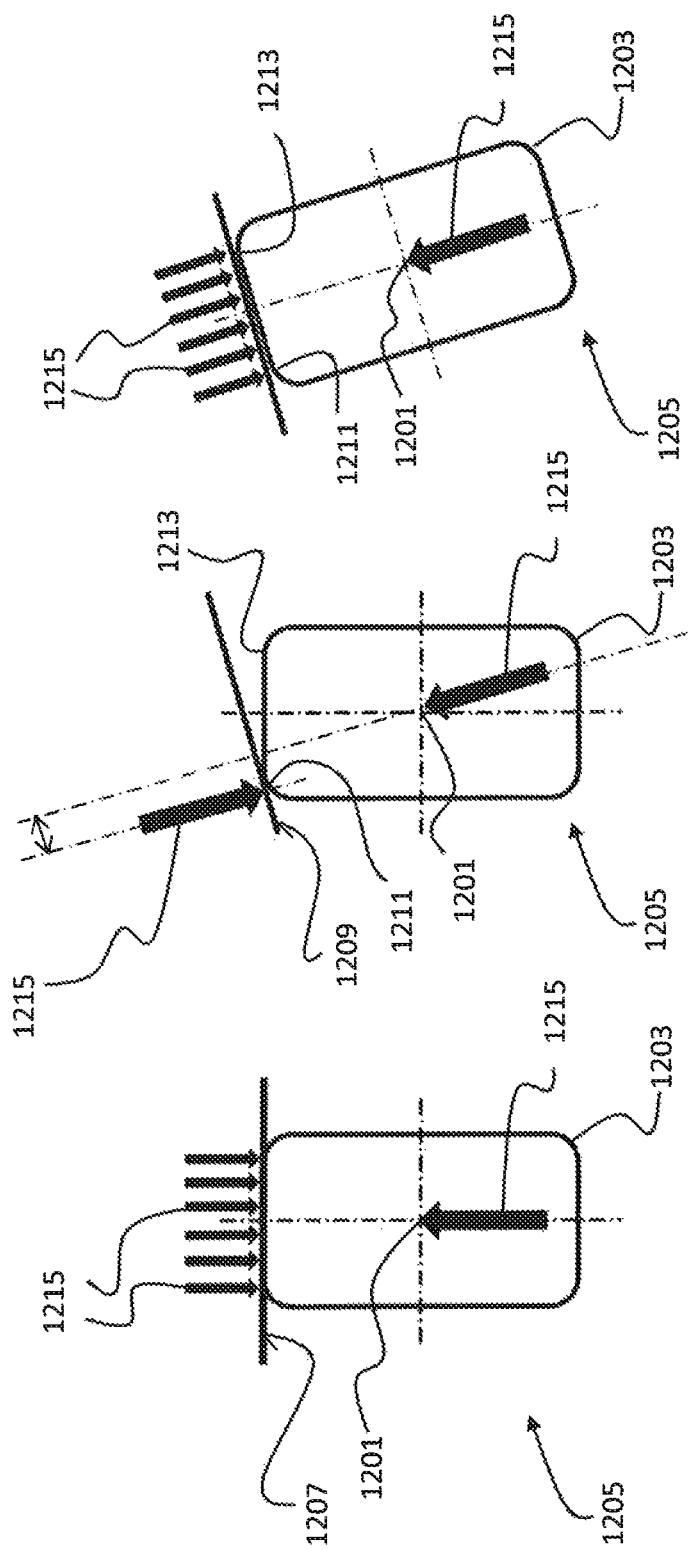

CONVEYING DEVICE AND CARRIAGE FOR CONVEYING DEVICE

CROSS-REFERENCE TO RELATED APPLICATION

This application claims priority to German Patent Application DE 10 2014 110 714.4, filed Jul. 29, 2014, entitled TRANSPORTVORRICHTUNG UND SCHLITTEN FÜR EINE TRANSPORTVORRICHTUNG, which is incorporated by reference herein, in the entirety and for all purposes.

FIELD

The invention relates to a conveying device and to a carriage for a conveying device.

BACKGROUND

Unexamined and first publication DE 10 2012 103 378 A1 discloses a conveying device having a linear-motor drive. The known conveying device comprises a movable carriage and an encircling track rail which is disposed so as to be locationally fixed, for guiding the carriage. The carriage has a plurality of track rollers which bear on track faces of the track rail which are disposed in various planes and during movement of the carriage roll on the track faces.

On account of comparatively intense dynamic friction which arises during curved travel, heavy wear may arise. The reason therefor inter alia is the so-called wide-tire effect, which will be explained in the following. The track roller passes through a tight radius, on account of which the two external edges of the track roller have different running speeds (the center of the track roller having the "correct" speed, the internal edge running too fast and the external edge running too slowly). This results in dynamic friction on the external edges and thus in significantly higher wear as compared with simple rolling friction.

A further reason for increased wear is to be seen in the position of the track rollers which are disposed so as to be behind one another in the direction of the track. Typically, such track rollers which are disposed behind one another are not conceived for curved travel. After all, on account of their geometry, the track rollers in curved travel do not run along the curved path but are urged to leave the curved path. One track roller would be urged to run out of the curve, and the other track roller would be urged to run into the curve. However, the track rollers are retained on the track and generate substantial friction. The latter requires a comparatively high force and causes very heavy wear in comparison to simple rolling on the straight track.

SUMMARY

It is an object of the present invention to provide a conveying device which overcomes the known disadvantages and enables curved travel of a carriage without wear or at least with reduced wear.

It is an object of the present invention to provide a corresponding carriage for a conveying device.

These objects are achieved by means of the respective subject matter of the independent claims. Preferred developments thereof are specified in the respective dependent claims.

EXAMPLES

According to one aspect, a conveying device is provided, said conveying device comprising:
at least one movable carriage,
on which at least one first group and at least one second group of track rollers are disposed;
a track rail which is disposed so as to be locationally fixed, for guiding the carriage; wherein
the track rail has at least one track face; wherein
the track rail has at least one straight portion and at least one curved portion; wherein
the track rollers of the first group and of the second group are configured in such a manner that
during movement of the carriage along the straight portion, exclusively the track rollers of the first group roll on the track face which is assigned to the straight portion; and
during movement of the carriage along the curved portion, exclusively the track rollers of the second group roll on the track face which is assigned to the curved portion.

According to a further aspect, a carriage is provided for the aforementioned conveying device, said carriage comprising:
in each case one first and one second group of track rollers, for rolling on the track face of the track rail of the conveying device; wherein
the track rollers of the first group and of the second group are configured in such a manner that
during movement of the carriage along the straight portion, exclusively the track rollers of the first group roll on the track face which is assigned to the straight portion; and
during movement of the carriage along the curved portion, exclusively the track rollers of the second group roll on the track face which is assigned to the curved portion.

According to yet another aspect, a conveying device is provided, the conveying device comprising:
at least one movable carriage,
on which a plurality of track rollers are disposed;
a track rail which is disposed so as to be locationally fixed, for guiding the carriage; wherein
the track rail has at least one track face; wherein
the track rail has at least one straight portion and at least one curved portion; wherein
at least one of the track rollers comprises a spherical bearing, such that a center of rotation of the track roller can automatically adapt to the track face which is assigned to the curved portion.

According to yet another aspect, a carriage for the aforementioned conveying device is provided, said carriage comprising:
a plurality of track rollers; wherein
at least one of the track rollers comprises a spherical bearing, such that a center of rotation of the track roller can automatically adapt to the track face which is assigned to the curved portion.

The invention thus comprises in particular the concept of providing two conveying devices or two carriages for such conveying devices, respectively, in order to address the aforementioned issue of wear in curved travel. The aforementioned issue is in one case addressed in that the carriage has one first group and one second group of track rollers which in each case have contact with the track face of the track rail only during movement along the straight portion or the curved portion, respectively. This means that during movement of the carriage along the straight portion, exclusively the track rollers of the first group roll on the track face, not however the track rollers of the second group. The latter during travel along the straight portion hover above the track face. During movement of the carriage along the curved portion, exclusively the track rollers of the second group roll on the track face, not however the track rollers of the first group. The latter during movement of the carriage along the curved portion hover above the track face and thus have no contact with the track face during curved travel.

On account of the provision of such track rollers, it is advantageously possible for the track rollers of the first and of the second group to be adapted in an optimal manner to straight travel or curved travel, respectively. This means that the track rollers of the first group are adapted in an optimal manner to straight travel; that is to say to movement along the straight portion. Accordingly, the track rollers of the second group are adapted in an optimal manner to curved travel; that is to say to movement along the curved portion. By contrast, the track rollers of the first group are not adapted in an optimal manner to curved travel. The track rollers of the second group are also not adapted in an optimal manner to straight travel. Here, wear would take place if the respective track rollers during curved or straight travel would correspondingly roll on the track face. However, since this is precisely not provided according to the invention, wear of the track rollers on account of sub-optimal curved travel or straight travel, respectively, is avoided.

A further advantage is derived in that the track rollers of the first group (for straight travel) only engage on the straight portion, and the track rollers of the second group (for curved travel) only engage on the curved portion. On account thereof, lower total operating times result for the individual track rollers and, on account thereof, already less wear results.

According to a second aspect, the aforementioned issue of wear during curved travel is also addressed in that at least one of the track rollers comprises a spherical bearing, preferably a plurality of track rollers, in particular all track rollers, comprise a spherical bearing. On account thereof, the technical advantage is in particular derived that a center of rotation of the track roller can automatically adapt to the track face which is assigned to the curved portion. The track roller is thus mounted on the carriage in particular by means of the spherical bearing. A track face of the track roller may thus continuously maintain contact with the track face. However, since the center of rotation is not rigid on account of the spherical bearing, but is self-aligning, the center of rotation of the track roller will also continuously adapt in an optimal manner to the portion which the carriage is currently passing through. In this way, the center of rotation of the track roller can adapt in an optimal manner to the track face of the curved portion. Advantageously, a reduction in dynamic friction can thus be ensured. On account thereof, wear is advantageously minimized or even prevented when the carriage passes a curved portion.

On account of the spherical bearing, the center of rotation of the track rollers or of the track faces of the track rollers thus automatically adapts to the respective track-face profile, that is to say in particular to straight track-face portions, but also to the curved profiles. On account of the spherical bearing, it is advantageously possible for the carriage to be employed for any arbitrary curve radii and curved contours. By means of such a carriage, in particular passing through a curve on the inside and/or the outside is advantageously enabled. Self-alignment of the center of rotation or of the roller axle is performed on account of the equilibrium of momentum. The point of origin is the center of the spherical bearing (pivot point of the track roller). During the transition from a track face of the straight piece to a track face of the curved piece, an external edge of the roller first touches the track face of the rail. Since the other external edge is not yet in contact with the rail and thus cannot establish a counter-force, the roller rotates about the center of the spherical bearing until the sum of all incidental forces is equal (cf. diagram of equilibrium of momentum according to FIG. 12).

The track roller having a spherical bearing in particular comprises the case in which the track roller is formed by the spherical bearing. The spherical bearing thus preferably forms the track roller.

Notwithstanding the fact that two different conveying devices are provided here, according to one embodiment it is provided that the conveying device has both a carriage having one first and one second group of track rollers as well as a carriage having a spherical bearing.

According to one embodiment, a plurality of movable carriages are provided. The plurality of carriages are in particular formed in an identical manner or preferably so as to be different.

Features, advantages, embodiments, such as described in the context of a carriage comprising one first and one second group of track rollers, in an analogous manner apply to the carriage comprising the spherical bearing, and vice-versa. This means, for example, that according to one embodiment a carriage which has both one first as well as one second group of track rollers as well as a track roller comprising a spherical bearing is provided. Features of the carriages may thus be combined with one another, for example.

According to one embodiment, it is provided that the track rollers of the second group have a truncated-cone shape. On account thereof, the wide-tire effect which has been described in the introduction to the description is advantageously avoided or at least mitigated. When properly conceived, the track roller thus advantageously passes through the curve without dynamic friction. "When properly conceived" is mentioned since the exact shape of the truncated cone has to be adapted to the curve which is specifically present, that is to say to the curve radius. The correlation between a specific truncated-cone shape and the curve radius is in particular based on the following explanations. In the curve, the path L1 of the outer radius is longer than the path L2 of the inner radius. In order for no relative movement to be performed while rolling thereacross, the roller on an external edge has to cover a longer path (U1) and the correspondingly shorter path (U2) on the other edge. Thus, a correspondingly conical roller is ideally required for each potential curve radius (cf. diagram of conical rollers according to FIG. 11).

According to one embodiment, it is provided that during movement along the curved portion respective centers of rotation of the track rollers of the second group are oriented in the direction of a center of the curve of the curved portion. On account thereof, the technical advantage is advantageously derived that the track rollers follow the provided curved path without transverse forces and thus do not cause any wear, since dynamic friction is advantageously avoided on account thereof. By providing that the respective centers of rotation of the track rollers of the second group during movement along the curved portion are oriented in the direction of the center of the curve of the curved portion, the track rollers of the second group are no longer configured in an optimal manner for straight travel. However, this is insignificant, since during movement of the carriage along the straight portion said track rollers of the second group do not roll on the track face.

The respective centers of rotation of the track rollers of the second group are thus oriented in such a manner that they are oriented in the direction of the center of the curve of the curved portion when the carriage is moved along the curved portion. This means in particular that the respective centers of rotation of the track rollers of the second group in relation to one another do not run in parallel but in each case rather form an angle which is greater than 0° and smaller than 180°. Here too, the exact angle, that is to say the exact orientation of the centers of rotation, depends on the curve radius of the curved portion which is specifically present.

In one other embodiment it is provided that the carriage and the track rail are symmetrical in relation to a longitudinal center plane. Preferably, the carriage has two carriage halves which are mirrored on the longitudinal center plane.

In one other embodiment it is provided that
the carriage and the track rail are symmetrical in relation to a longitudinal center plane, wherein
the carriage has two carriage halves which are mirrored on the longitudinal center plane and of which each has in each case one first group and one second group of track rollers; wherein
on a first lateral flank and on a second lateral flank of the track rail in each case one first and one second track face for the track rollers are formed; wherein
the respective track rollers of the first and of the second group are assigned to the first or to the second track face, such that
during movement of the carriage along the straight portion, exclusively the track rollers of the first group bear on track faces assigned thereto and roll thereon; and
during movement of the carriage along the curved portion, exclusively the track rollers of the second group bear on track faces assigned thereto and roll thereon.

On account thereof, the technical advantage is in particular derived that a firm mounting of the carriage along the track rail is enabled, since two track faces on which the track rollers can roll are provided per longitudinal side.

In one other embodiment it is provided that
the first and the second groups have in each case three track rollers; wherein
two of the three track rollers of the respective first group are assigned to the second track face, and the third track roller of the respective first group is assigned to the first track face; wherein
two of the three track rollers of the respective second group are assigned to the first track face, and the third track roller of the respective second group is assigned to the second track face.

In particular two triangles of in each case three track rollers are thus provided per carriage half, one triangle of three track rollers of the first group and one triangle of three track rollers of the second group. It is preferably provided that the third track roller of the first group, which is assigned to the first track face, is disposed between the two track rollers of the second group, which, after all, are likewise assigned to the first track face. It is preferably provided that the third track roller of the second group, which is assigned to the second track face, is disposed between the two track rollers of the first group, which, after all, are likewise assigned to the second track face. The triangles which are in each case formed by the three track rollers of the first group and the three track rollers of the second group, thus mutually overlap, that is to say that they are disposed in an overlapping manner. Here, the top of one of the triangles is on the center of the base of the other triangle, and vice-versa. The triangles are formed as isosceles triangles, for example. The track rollers are thus disposed correspondingly. The triangles are formed in particular as equilateral triangles, that is to say that all three sides of the triangle are of equal length. The track rollers are disposed correspondingly.

In one other embodiment of the invention, in which at least one of the track rollers has a spherical bearing, it is provided that a delimiting installation for delimiting a deflection angle of the bearing is provided. On account thereof, the technical advantage is derived that an angular deflection of the spherical and thus self-aligning bearing can be delimited, advantageously facilitating rerailing of the carriage on the guide rail, for example. On account of the delimiting installation, the technical advantage in particular is derived that potential coasting of the bearing can be prevented, wherein coasting may arise, for example, in the case of unforeseeable transverse forces which result, for example, from contamination of the track rail and/or from loading of the carriage.

In one embodiment, it is provided that the delimiting installation comprises a thrust washer which is disposed so as to be transverse to the center of rotation of the track roller having the spherical bearing. On account thereof, the technical advantage is derived that, for example, the deflection angle of the bearing can be delimited by way of a simple means and by way of a simple assembly. For this purpose, the bearing per se need not have a bearing-side delimiting means. Thus, a universal spherical bearing may be used for a plurality of carriages, for example, wherein the desired delimitation may be specifically adjusted for the specific application by means of a corresponding thrust washer. This saves costs, for example. Also, the delimitation of the deflection angle may be subsequently readjusted, for example, by replacing the thrust washer with another model, without the complete bearing having to be replaced to this end.

In one embodiment, it is provided that the delimiting installation comprises a bearing-side delimiting means. On account thereof, the technical advantage is derived that, for example, installation space may be saved, in as far as a thrust washer can be dispensed with here, for example. Also, no additional delimiting means has to be installed, for example, since the bearing per se includes such a delimiting means. This may reduce fitting time, for example.

In one other embodiment, it is provided that the delimiting installation comprises both the thrust washer as well as the bearing-side delimiting means. Thus, redundancy in terms of delimiting the deflection angle is advantageously provided, for example. Even in the case of a defect, for example on account of damage, of one of the means for delimiting the deflection angle, the other means can still assume the delimiting function.

In one other embodiment, it is provided that in relation to a longitudinal axis of the carriage, exclusively the outboard track rollers comprise in each case one spherical bearing. This means that in particular the remaining track rollers do not comprise a spherical bearing. The remaining track rollers comprise a ball bearing or another bearing which does not have a self-aligning function, for example, since only the outboard track rollers are usually subject strongest to the aforementioned issues in terms of dynamic friction which arises during curved travel. To this extent, it is also meaningful for only these outboard track rollers to be provided with a spherical bearing.

In one other embodiment, it is provided that the bearing is an element which has been selected from the following group of bearings: self-aligning ball bearings, self-aligning roller bearings, and barrel roller bearings. In particular, other spherical bearings are also provided. The employment of the corresponding aforementioned bearings in particular depends on available installation space (geometric dimensions of the bearings), transmittable axial load, transmittable radial load, and potential angular compensation for the respective applications.

According to one embodiment, the spherical bearing is a pivot bearing having a spherical pig, wherein a grooved ball bearing is fitted or disposed on the pivot bearing.

According to one other embodiment, a linear-motor driving device for driving the carriage is provided. The carriage comprises, for example, one or a plurality of permanent magnets which are operatively connected to the linear-motor driving device. For example, the linear-motor driving device comprises a plurality of coils which are lined up next to one another and which can be individually energized. When a coil is energized, localized magnetic fields are created, and there is thus a magnetic flux between the coils and the permanent magnet(s) of the carriage. By way of actuating and energizing the individual coils in a smart manner, a "traveling" magnetic field which can move each individual carriage independently of other carriages may be generated.

In one embodiment, the track rail has a profile in the shape of a double T.

In one other embodiment, the track rail has slanted track faces.

In one embodiment, the track rail is formed so as to be encircling, that is to say closed. In one further embodiment, the track rail is formed so as to be open, thus not to be encircling.

BRIEF DESCRIPTION OF THE DRAWINGS

The invention is explained in more detail with reference to the appended drawings. In the drawings:

FIGS. 3a, 3b, and 3c show the carriage according to FIG. 1 during movement along a straight portion of a track rail.
FIG. 10 shows a conveying device.
FIG. 11 shows a conical track roller.
FIG. 12 shows an in-principle diagram for explaining the equilibrium of momentum.

DETAILED DESCRIPTION

Same reference signs may be used in the following for same features. It may furthermore be provided for the sake of clarity that not all features have reference signs in all drawings.

Figure 1:
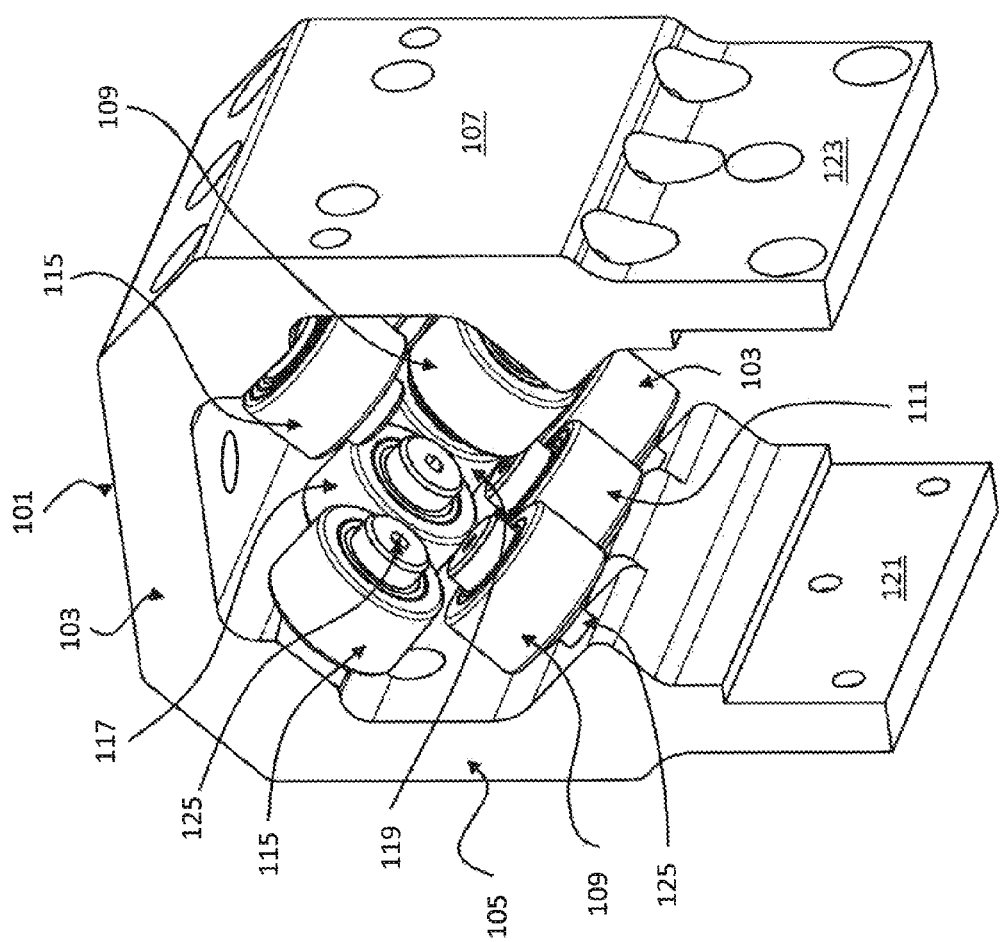
FIG. 1 shows a carriage for a conveying device.

FIG. 1 shows a carriage 101 for a conveying device.

The carriage 101 has a U-shaped main body 103. To this extent, the U-shaped main body 103 comprises two legs 105 and 107 which lie opposite one another. Track rollers 109, 111, 113, 115, 117, and 119 are disposed on the internal sides of the legs 105, 107, which lie opposite one another. The track rollers 109, 113, 117 form a first group. The track rollers 111, 115, 119 form a second group. The track rollers 109, 113, 117 of the first group here are configured in such a manner that during movement of the carriage 101 along a straight portion of a track rail of the conveying device, exclusively these track rollers 109, 113, 117 roll on the track face which is assigned to the straight portion. The track rollers 111, 115, 119 of the second group are configured in such a manner that during movement of the carriage 101 along a curved portion of the track rail of the conveying device, exclusively these track rollers 111, 115, 119 roll on the track face which is assigned to the curved portion. How this is implemented in detail will be further explained hereunder.

As is shown in FIG. 1, the carriage 101 is symmetrical in relation to a longitudinal center plane, such that the carriage 101 has two carriage halves which are mirrored on the longitudinal center plane, here in particular the two legs 105 and 107.

In each case six track rollers are thus formed on the internal sides of the two legs 105, 107: three track rollers 109, 113, 117 of the first group, and three track rollers 111, 115, 119 of the second group. The respective track rollers of the two groups are disposed in a triangular assembly on the internal side of the respective legs. This means that the track rollers of the respective groups form a triangle. It is provided that one of the track rollers of the one group is located between two track rollers of the other group, and vice-versa. This thus means that the track roller 117 which belongs to the first group is disposed between the two track rollers 115 and 119 of the second group. Accordingly, the track roller 111 which belongs to the second group is disposed between the two track rollers 109 and 113 of the first group.

The track rollers 115, 117, and 119 are assigned to a second track face 205 (cf. FIG. 2) of a track rail of the conveying device. The track rollers 109, 111, 113 are assigned to a first track face 203 (cf. FIG. 2) of the track rail of the conveying device. This means that during curved travel of the carriage 101, only the track rollers 111, 115, 119 of the second group roll on the associated track faces. This means that during curved travel, the track rollers 115 and 119 roll on the second track face 205. During curved travel, the track roller 111 rolls on the track face 203. During this curved travel, the track rollers 109, 113, 117 of the first group have no contact with the track faces 203, 205.

By contrast, during straight travel the track rollers 111, 115, 119 of the second group have no contact with the track faces 203, 205. By contrast, the track rollers 109, 113 roll on the first track face 203. The track roller 117 rolls on the second track face 205.

The reference sign 125 points to a center of rotation of the track rollers 109, 111, 113, 115, 117, 119. The reference sign 121 points to an end portion of the leg 105. The reference sign 123 points to an end portion of the leg 107. One or a plurality of permanent magnets which may be operatively connected to a linear-drive device, for example, may be disposed on the end portions 121, 123, for example. Such a linear-drive device comprises, for example, a plurality of coil packs which can be individually energized, such that a "traveling" magnetic field may be configured, for example, which interacts with the magnetic field of the permanent magnets on the carriage 101 and provides propulsion for the carriage 101.

Figure 2:
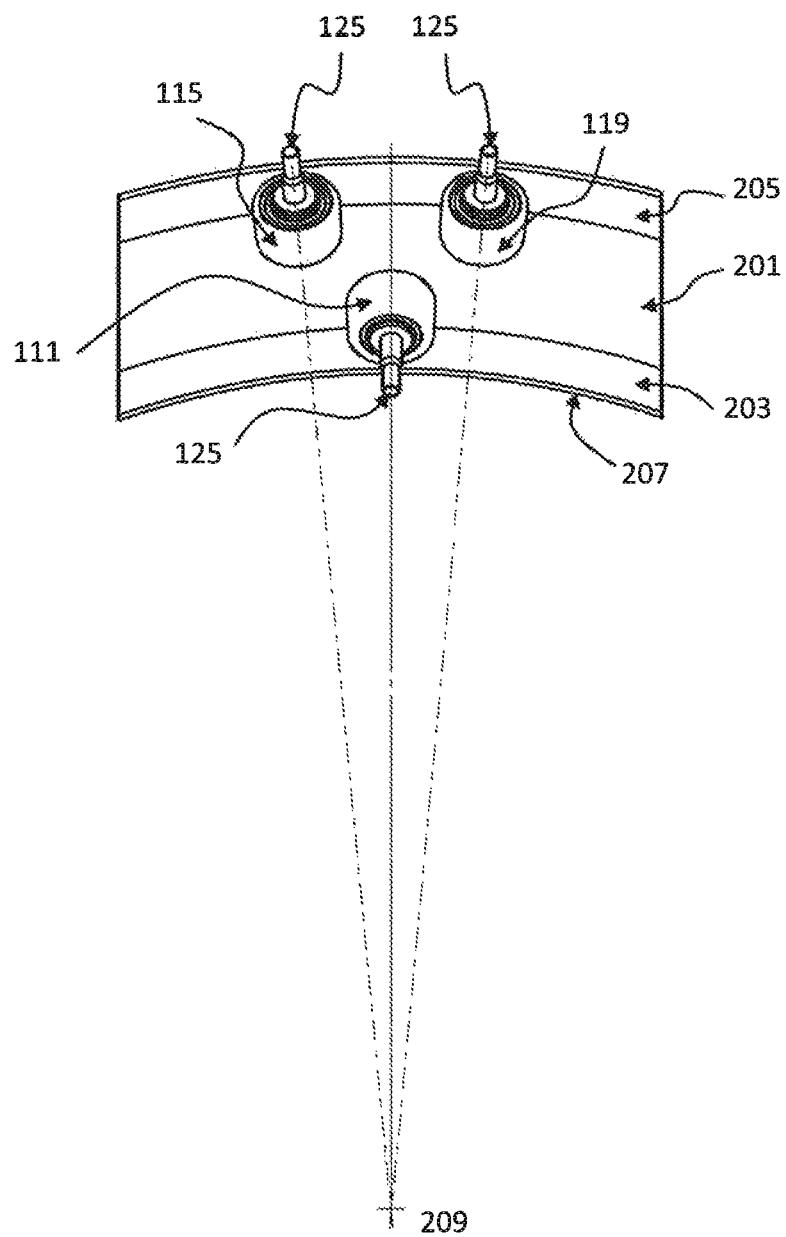
FIG. 2 shows a roller assembly for the carriage of FIG. 1.

FIG. 2 shows a roller assembly of the track rollers 115, 119, and 111 of the carriage 101 according to FIG. 1. As can be seen, these track rollers pass a curved portion 207 of a track rail 201. The two track faces 203 and 205 are visible here.

The curved portion 207 thus has a curve radius having a corresponding center of the curve 209. The respective centers of rotation 125 of the track rollers 115, 119, 111 are oriented in the direction of the center of the curve 209. On account thereof, it is advantageously derived that these track rollers of the second group can travel through the curved portion 207 without transverse forces. They remain on the provided path, such that no wear is caused on account thereof, since no dynamic friction arises.

The track rollers 111, 115, 119 of the second group furthermore have a truncated-cone shape. This means that the track rollers 111, 115, 119 are configured like a truncated cone. If the truncated cone is correspondingly configured, these track rollers of the second group thus pass the curved portion 207 without dynamic friction. The wide-tire effect which has been illustrated in the introduction to the description is thus advantageously avoided.

FIGS. 3a, 3b, 3c show the carriage 101 according to FIG. 1 during straight travel along the track rail 201, in various views.

The view according to FIG. 3a shows a cross-sectional view of the carriage 101, wherein the latter here, for the sake of clarity, is not completely drawn but is shown in a cutaway drawing. The track rail 201 has a shape of a double-T profile with the slanted track faces 203, 205. The coil packs are located below the track rail 201 in relation to a plan view of the paper plane, such that the coil packs during movement of the carriage 101 along the track rail 201 are disposed between the end portions 121, 123.

FIG. 3a shows two arrows A and B which in a symbolic manner illustrate a corresponding plan view of the individual track rollers of the carriage 101. Accordingly, the reference sign 305 (according to FIG. 3b) points to this plan view according to the arrow A. Accordingly, the reference sign 307 points to a drawing (according to FIG. 3c) which shows a plan view along the arrow B. The orientation of the running axles or centers of rotation 125 of the track rollers of the second group, which do not run parallel in relation to one another but rather are aligned toward the center of the curve 209, can be clearly seen. However, since the carriage 101 here passes in straight travel, that is to say is moved along a straight portion 309 of the track rail 201, the track rollers 111, 115, 119 of the second group have no contact with the track faces 203, 205 which are assigned thereto.

Figure 4:
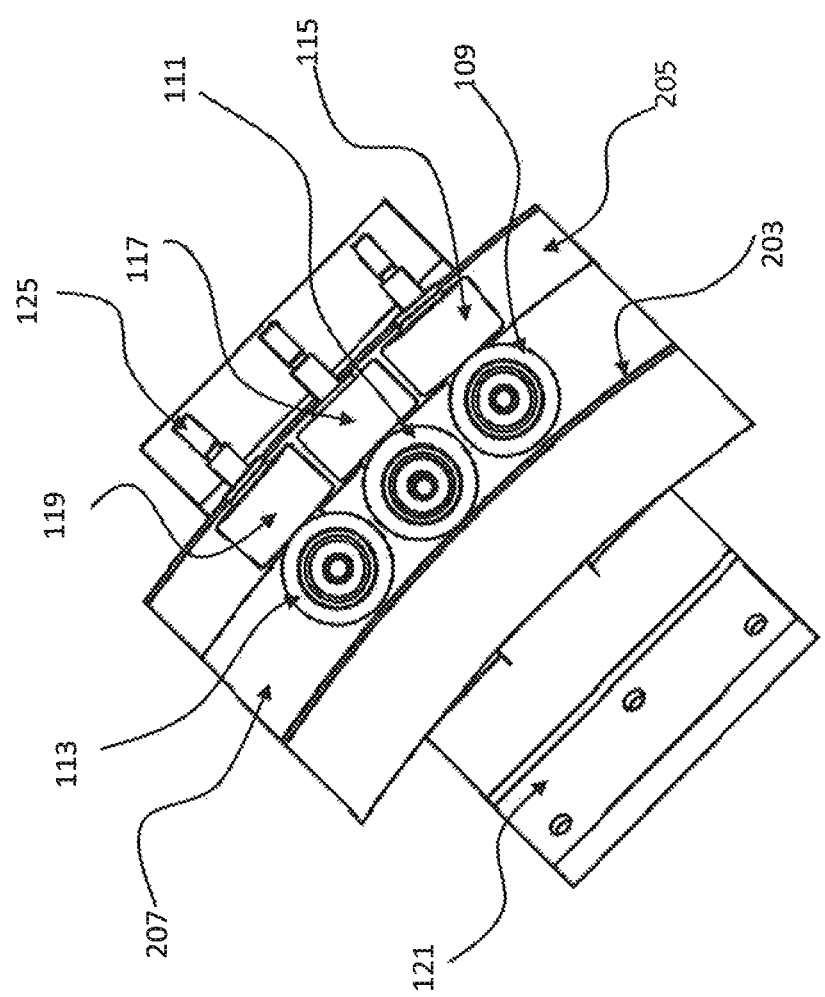
FIGS. 4a, 4b and 4c show the carriage according to FIG. 1 during movement along a curved portion of a track rail.

FIGS. 4a, 4b, 4c show the carriage 101 according to FIG. 1, during curved travel. The views which are illustrated in FIGS. 4a, 4b, 4c are analogous to FIGS. 3a, 3b, 3c. Reference can thus be made to the respective narratives.

Figure 5A:
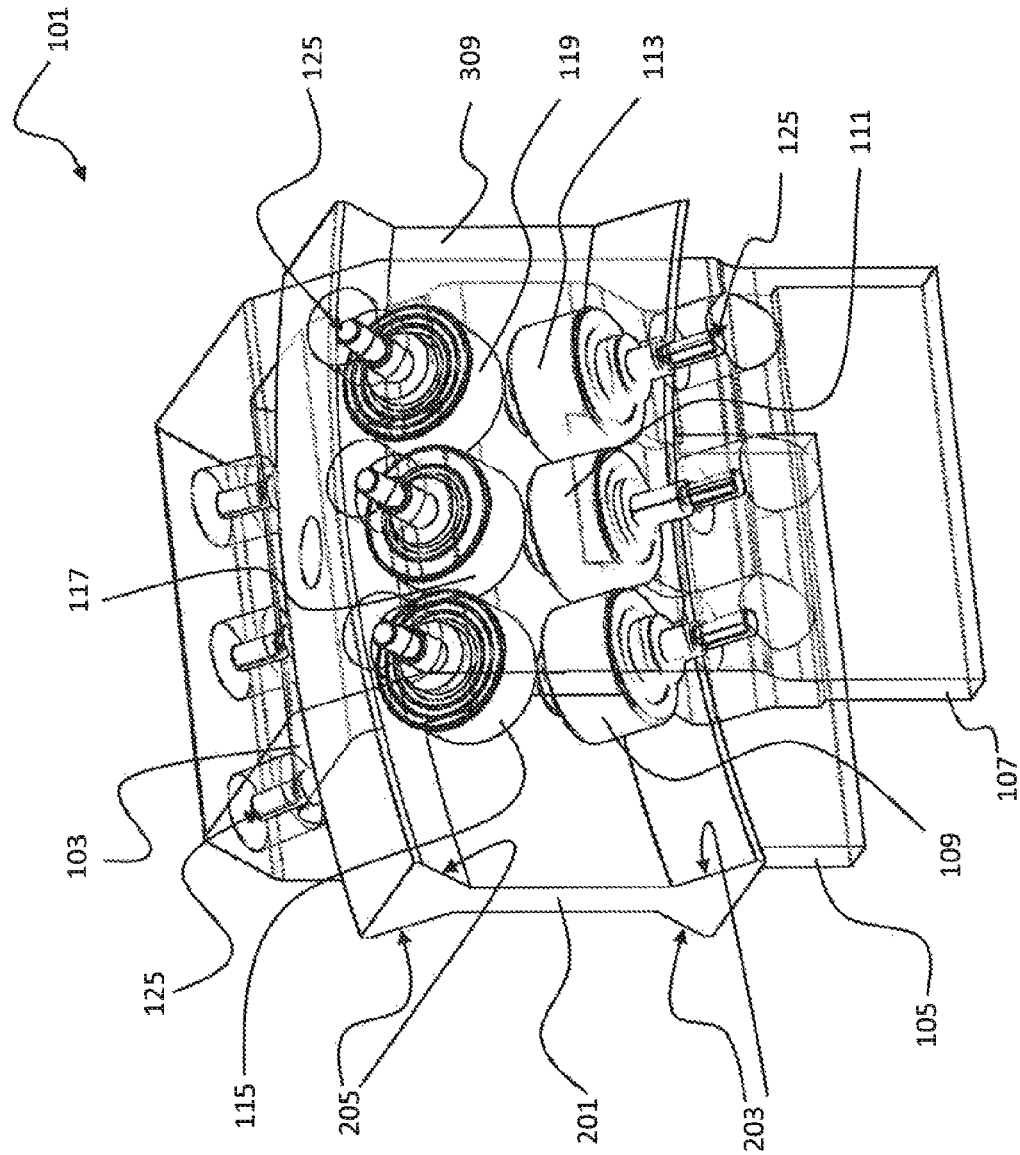
FIGS. 5a, 5b and 5c show the carriage according to FIG. 1 during curved travel.
Figure 5:
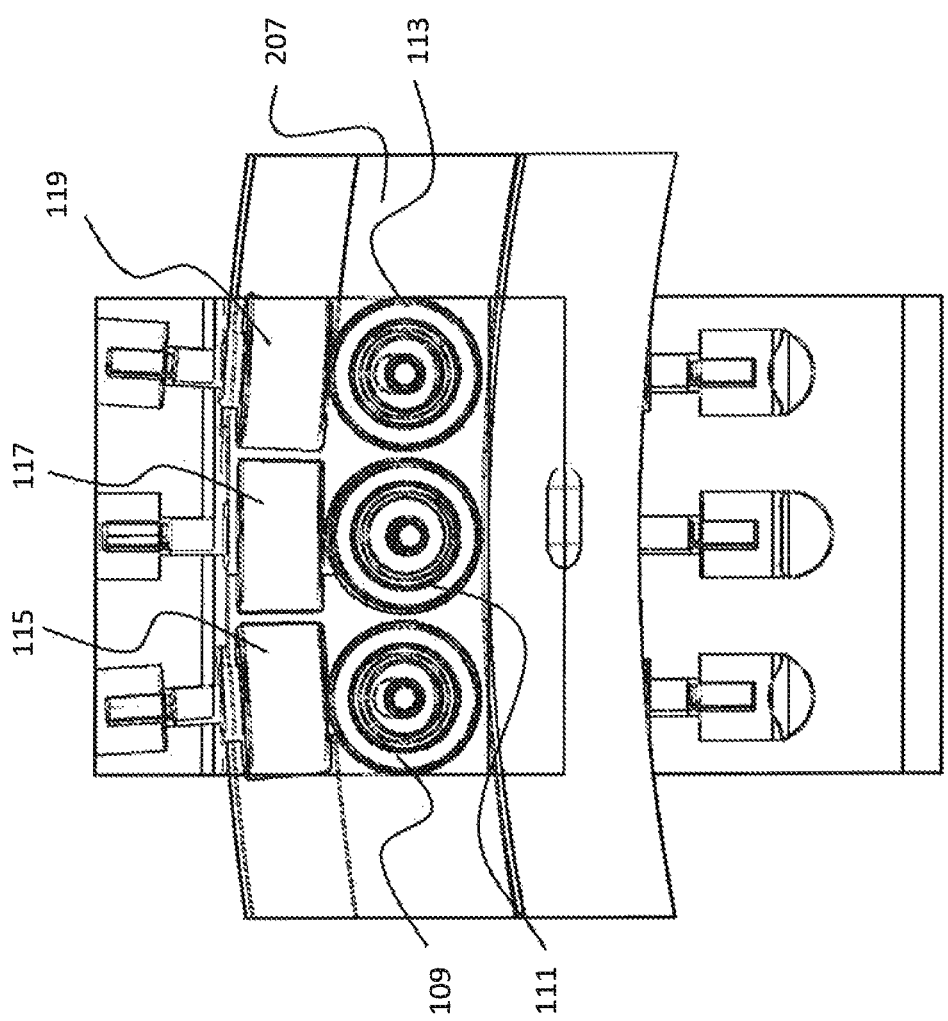

FIGS. 5a, 5b, 5c in each case show the carriage 101 according to FIG. 1, during curved travel, in a further perspective view. The views which are illustrated in FIGS. 5a, 5b, 5c are analogous to FIGS. 3a, 3b, 3c, such that reference is made to the respective narratives. The leg 107 is drawn so as to be transparent in the perspective views, such that the track rollers are visible. For the sake of clarity, the track rollers which are disposed on the leg 105 have not been illustrated. Only the track rollers 115, 119, 111 of the second group have contact with the track faces 203, 205 which are assigned thereto. The track rollers of the second group and also of the first group in each case form a triangle. In one embodiment, at least one group, for example both groups, may have more than three track rollers. In this way, it is provided, for example, that a spacing between the two track rollers 109, 113 is increased, such that the single track roller 111 between these two track rollers 109 and 113 is replaced by two track rollers. The same applies to the track rollers 115, 117, 119. It is provided here, for example, that the spacing between the two track rollers 115, 119 is increased, such that the single track roller 117 is replaced by two track rollers. The replaced rollers belong to the same group as the replaced track roller.

Figure 6:
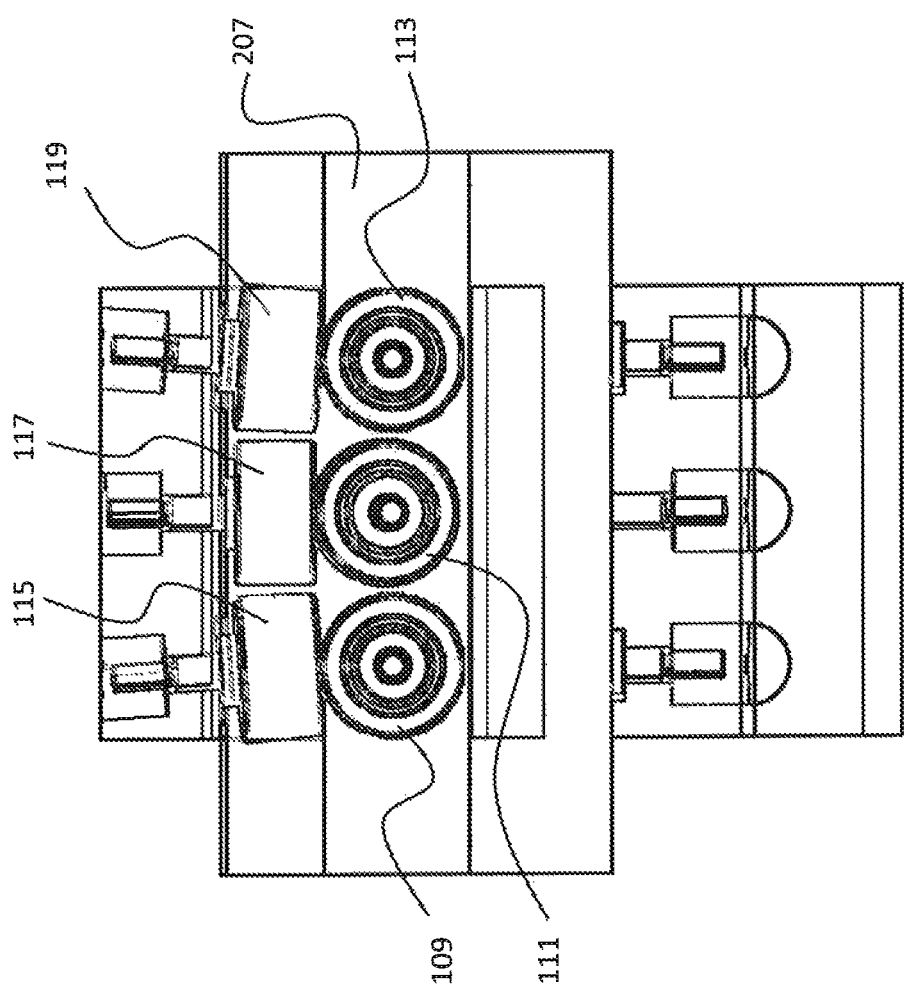
FIGS. 6a, 6b and 6c show the carriage according to FIG. 1 during straight travel.

FIGS. 6a, 6b, 6c in each case show the carriage 101 according to FIG. 1, during straight travel, in a further perspective view. The views which are illustrated in FIGS. 6a, 6b, 6c are analogous to FIGS. 5a, 5b, 5c, such that reference is made to the respective narratives.

During straight travel, only the track rollers 109, 113, 117 are employed. As has been narrated above, these track rollers form a triangle, and it may also be provided that more than three track rollers are provided for the first group. In particular in the case of more than three track rollers per group, higher mechanical stability is derived. The carriage 101 is advantageously more stable in terms of tilting in the travel direction.

Figure 7:
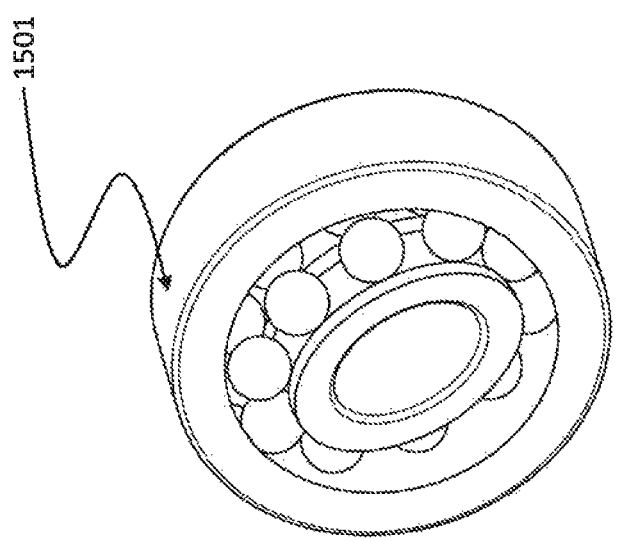
FIG. 7 shows a self-aligning ball bearing.

FIG. 7 shows a spherical bearing in the form of a self-aligning ball bearing 1501.

Figure 8:
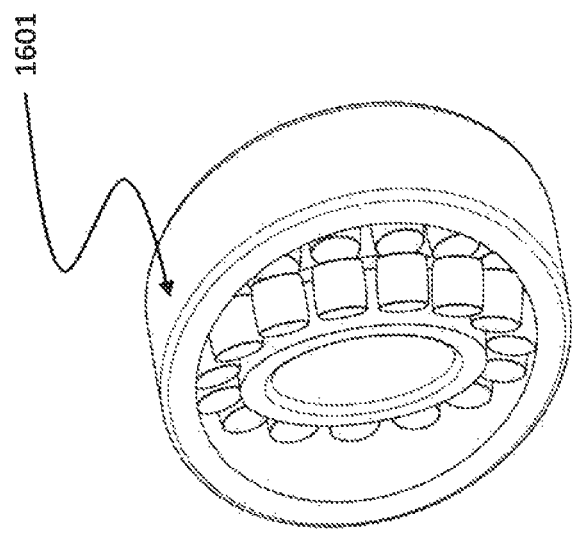
FIG. 8 shows a self-aligning roller bearing.

FIG. 8 shows a spherical bearing in the form of a self-aligning roller bearing 1601.

These two bearings 1501, 1601 which due to their construction are self-aligning, are provided for one embodiment of a carriage for a conveying device. This means that at least one of the track rollers, in particular a plurality thereof, for example all track rollers of the carriage comprise(s) one such spherical bearing. This means that the respective track roller is mounted on the carriage by means of such a bearing. It is provided here, for example, that these bearings by way of their respective track faces directly roll on the track faces of the track rail. In one other embodiment, these spherical bearings have covers of plastic or rubber, for example, such that these covers roll on the track faces of the track rail.

Figure 9:
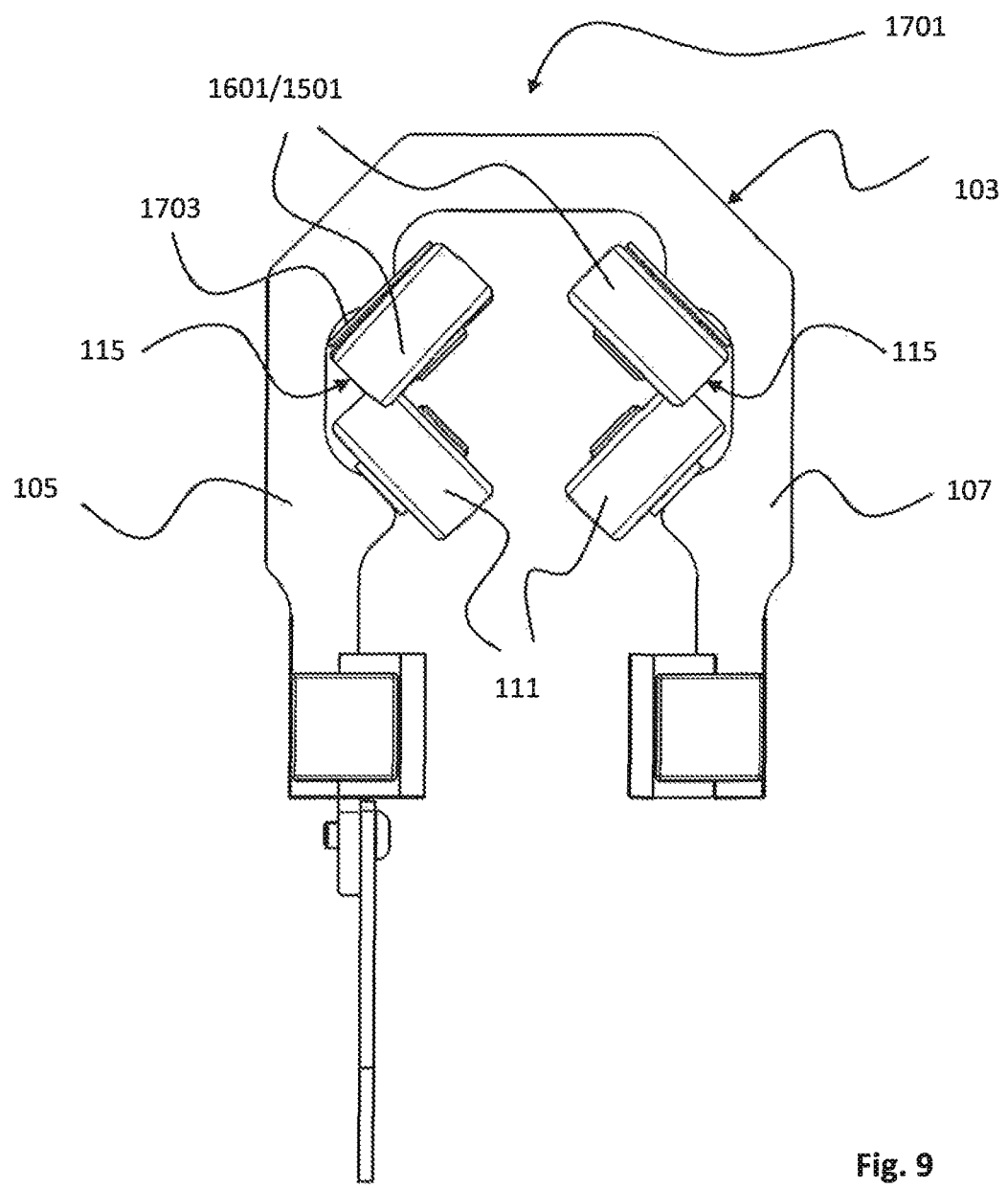
FIG. 9 shows a further carriage.

FIG. 9 now shows such a carriage 1701 for a conveying device. The carriage 1701 is constructed in an analogous manner to the carriage 101 according to FIG. 1. As a point of differentiation, the track rollers 115, 119, 109, 113, that is to say the outboard track rollers in the travel direction, have such a spherical bearing. In the embodiment which is shown in FIG. 9, these bearings form the track roller.

In the case of the carriage 1701, a thrust washer 1703 which is disposed so as to be transverse to the center of rotation 125 of the track roller which comprises the self-aligning bearing is provided. This thrust washer 1703 causes a delimitation of a deflection angle of the spherical bearing 1601 or 1501.

In one embodiment it is provided that the self-aligning bearing comprises a bearing-side delimiting means, in particular additionally or alternatively to the thrust washer 1703.

FIG. 10 shows a conveying device 1901 in an exemplary configuration. Here, the track rail 201 has an encircling shape. This means that the track rail 201 is closed. The two curved portions 207 and the straight portions 309 of the track rail 201 can be seen. The curved portions 207 may have a circular shape or a clothoid shape, for example. The reference sign 1903 points to coil packs of the conveying device 1901. The carriages 101 and 1701 are placed onto the track rail 201, and may be moved along the track rail 201. In further exemplary embodiments a plurality of carriages 101 and/or a plurality of carriages 1701 are provided.

FIG. 11 shows a conical track roller 1101 which may be used for the track rollers of the second group, for example. This means that the track rollers of the second group are conical track rollers, in an analogous manner to the track roller 1101 of FIG. 11. "Conical" here means that the track roller 1101 has a truncated-cone shape. The correlation between a specific truncated-cone shape and the curve radius is to be explained in more detail in the following by means of the diagrams illustrated in FIG. 11. In the curve (or in the curved portion) 1103, the path L1 of the outer radius of the curve 1103 is longer than the path L2 of the inner radius of the curve 1103. In order for no relative movement to be performed while rolling thereacross, the track roller 1101 on an external edge 1105 has to cover a longer path (U1) and the correspondingly shorter path (U2) on the other edge (internal edge) 1107. Thus, a correspondingly conical track roller is ideally required for each potential curve radius. The triangle 1109 above the double arrow 1111 again symbolizes that the diameter of the track roller 1101 on the edge 1107 is smaller than the diameter of the track roller 1101 on the edge 1105.

FIG. 12 shows an in-principle diagram for explaining the equilibrium of momentum. The point of origin is the center 1201 of the spherical bearing 1205 (pivot point of the track roller 1203). During the transition from a track face 1207 of the straight piece to a track face 1209 of the curved piece, an external edge 1211 of the roller first touches the track face 1209 of the track rail. Since the other external edge 1213 is not yet in contact with the rail (central drawing in FIG. 12) and thus cannot establish a counterforce, the roller rotates about the center of the spherical bearing until the sum of all incidental forces is equal (right-side or left-side drawing in FIG. 12). The forces which arise are illustrated by means of solid arrows having the reference sign 1215.

In summary, the invention thus comprises in particular the concept of providing a carriage for a conveying device, which carriage in each case has roller combinations (first and second group) which are either conceived in an optimal manner for straight travel or for curved travel and in each case bear on the rail (more specifically on the track face of the rail) only in their region (that is to say the straight portion or the curved portion). The invention in particular comprises the concept of providing self-aligning bearings for at least some of the track rollers of the carriage, which track rollers, on account of the equilibrium of forces during curved travel, align themselves in an optimal manner. In both cases (spherical bearing and two roller combinations), wear on the track rollers is advantageously minimized.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A conveying device, comprising:
   at least one movable carriage, on which at least one first group and at least one second group of track rollers are disposed; and
   a track rail disposed so as to be locationally fixed, for guiding the carriage;
   wherein the track rail has at least one track face;
   wherein the track rail has at least one straight portion and at least one curved portion; and
   wherein the track rollers of the first group and of the second group are configured such that during movement of the carriage along the straight portion of the track rail, exclusively track rollers of the first group roll on a track face assigned to the straight portion; and
   during movement of the carriage along the curved portion of the track rail, exclusively track rollers of the second group roll on a track face assigned to the curved portion.

2. The conveying device as claimed in claim 1, wherein at least one track roller of the first or second group has a truncated-cone shape.

3. The conveying device as claimed in claim 1 or 2, wherein during the movement along the curved portion of the track rail, respective centers of rotation of the track rollers of the second group are oriented in a direction of a center of a curve of the curved portion.

4. The conveying device as claimed in claim 1, wherein
   the carriage and the track rail are symmetrical in relation to a longitudinal center plane, and
   the carriage has two carriage halves which are mirrored on the longitudinal center plane and of which each has one of said first group and one of said second group of track rollers;
   wherein on a first lateral flank and on a second lateral flank of the track rail one first and one second track face for the track rollers are formed;
   wherein respective track rollers of the first and second group are assigned to the first or second track face, such that during movement of the carriage along the straight portion of the track rail, exclusively track rollers of the first group bear on track faces assigned thereto and roll thereon; and
   during movement of the carriage along the curved portion of the track rail, exclusively track rollers of the second group bear on track faces assigned thereto and roll thereon.

5. The conveying device as claimed in claim 4, wherein the first and the second groups each have three track rollers;
   wherein two of the track rollers of the first group are assigned to the second track face, and a third track roller of the first group is assigned to the first track face; and
   wherein two of the track rollers of the second group are assigned to the first track face, and a third track roller of the second group is assigned to the second track face.

6. A conveying device, comprising:
   at least one movable carriage, on which a plurality of track rollers are disposed; and
   a track rail disposed so as to be locationally fixed, for guiding the carriage;
   wherein the track rail has at least one track face;
   wherein the track rail has at least one straight portion and at least one curved portion; and
   wherein at least one of the track rollers comprises a spherical bearing, such that a center of rotation of the at least one track roller automatically adapts to a track face assigned to the curved portion of the track rail.

7. The conveying device as claimed in claim 6, wherein a delimiting installation for delimiting a deflection angle of the bearing is provided.

8. The conveying device as claimed in claim 7, wherein the delimiting installation comprises a thrust washer disposed transverse to a center of rotation of the track roller having the spherical bearing.

9. The conveying device as claimed in claim 7, wherein the delimiting installation comprises a bearing-side delimiting means.

10. The conveying device as claimed in claim 6, wherein, in relation to a longitudinal axis of the carriage, exclusively outboard track rollers comprise in each case one spherical bearing.

11. A carriage for a conveying device having a track rail disposed so as to be locationally fixed, for guiding the carriage, the carriage comprising:

one first and one second group of track rollers, for rolling on at least one track face of the track rail, wherein the track rail has at least one straight portion and at least one curved portion;

wherein the track rollers of the first group and of the second group are configured such that during movement of the carriage along the straight portion of the track rail, exclusively track rollers of the first group roll on a track face assigned to the straight portion; and during movement of the carriage along the curved portion of the track rail, exclusively track rollers of the second group roll on a track face assigned to the curved portion.

12. A carriage for a conveying device as claimed in claim 11, comprising:

a plurality of the track rollers;

wherein at least one of the track rollers comprises a spherical bearing, such that a center of rotation of the at least one track roller automatically adapts to the track face assigned to the curved portion of the track rail.

* * * * *